United States Patent [19]
Shirley et al.

[11] Patent Number: 5,944,456
[45] Date of Patent: Aug. 31, 1999

[54] THREE DIMENSIONAL MILL AND MILLING INSERTS

[75] Inventors: Ralph D. Shirley, Saltsburg; Gary D. Baldwin, Ligonier, both of Pa.; Kay E. Kucharik, Maple Heights; William C. Magill, Mentor, both of Ohio; Alfred R. Augustine, New Alexandria, Pa.; Robert A. Acero, Kingsport, Tenn.; William R. Shaffer, Greensburg, Pa.

[73] Assignee: Kennametal Inc., Latrobe, Pa.

[21] Appl. No.: 08/985,483

[22] Filed: Dec. 4, 1997

[51] Int. Cl.⁶ ........................................ B23C 5/20
[52] U.S. Cl. ................. 407/42; 407/47; 407/51; 407/53; 407/59
[58] Field of Search ................. 407/42, 113, 34, 407/35, 40, 47, 48, 51, 53, 54, 55, 58, 59, 60, 61, 63, 64, 65, 114

[56] References Cited

U.S. PATENT DOCUMENTS

| | | | |
|---|---|---|---|
| 4,182,587 | 1/1980 | Striegl | 407/59 X |
| 4,294,565 | 10/1981 | Erkfritz | 407/113 |
| 4,693,641 | 9/1987 | Tsujimura et al. | 407/42 |
| 4,808,045 | 2/1989 | Tsujimura et al. | 408/204 |
| 4,930,945 | 6/1990 | Arai et al. | 407/40 |
| 4,946,318 | 8/1990 | David et al. | 407/114 X |
| 5,083,887 | 1/1992 | Dotany | 407/59 |
| 5,388,932 | 2/1995 | DeRoche et al. | 407/114 X |
| 5,460,464 | 10/1995 | Arai et al. | 407/114 |
| 5,542,792 | 8/1996 | Krueger | 407/35 |
| 5,542,795 | 8/1996 | Mitchell | 407/35 |

FOREIGN PATENT DOCUMENTS

| | | | |
|---|---|---|---|
| A30489701 | 6/1992 | European Pat. Off. | |
| 2702403 | 9/1994 | France | |
| 3617308 | 11/1986 | Germany | 407/114 |
| WO93/00192 | 1/1993 | WIPO | |
| WO9317822 | 9/1993 | WIPO | |
| WO95000272 | 1/1995 | WIPO | 407/113 |

OTHER PUBLICATIONS

Copy of International Search Report, mailed Mar. 6, 1999, in Application No. PCT/US98/24761, filed Nov. 18, 1998.

Primary Examiner—Andrea L. Pitts
Assistant Examiner—Henry W. H. Tsai
Attorney, Agent, or Firm—John M. Vasuta

[57] ABSTRACT

A three dimensional mill capable of plunging, ramping, circle interpolating and other milling processes while providing a finished surface not in need of finish grinding. The milling cutter includes cutting inserts of a modified design including flats separating rounded corners of a two radius design. Each insert also includes a rail that is secured to the milling cutter along a longitudinal surface that is radial to the axis of the milling cutter at any cross sectional plane.

17 Claims, 9 Drawing Sheets

THREE DIMENSIONAL MILL AND MILLING INSERTS

FIELD OF THE INVENTION

The present invention generally relates to milling cutters and cutting inserts used thereon and specifically milling cutters and cutting inserts for three dimensional milling which include such steps as ramping, plunging, circle or helical interpolating, facing, and end milling, and require a ground-type finished surface.

BACKGROUND OF THE INVENTION

Machining of various metals to form rough or finished end products has long been accomplished using any number of machining and/or cutting techniques including milling, turning, facing, boring, drilling, grinding, forming, shaping, planing, threading, grooving, etc. Each of these machining and/or cutting techniques involves significantly different processes, CNC machines and holders, cutting orientations and angles, entry angles, lead angles and cutting forces, cutting surfaces and inserts, pitches, and numerous other factors. In addition, each of these various machining and/or cutting techniques provides significantly different finished product in terms of use, shape, look, quality, finish, surface texture, surface roughness or smoothness, stress and cracking points, fatigue points, depth of cut, uniformity of cut, and numerous others features. For these reasons, tooling is generally technique specific.

Although milling and turning tools, and the cutting inserts used therewith, are sometimes similar in general appearance, the two processes are different in many ways above and beyond the obvious difference in that, in milling, the cutting insert generally moves and the workpiece is generally fixed while, in turning, the workpiece generally moves and the cutting insert is generally fixed. As is well known in the machining art, the art of milling versus turning involves significantly different factors, concerns, benefits and difficulties.

In milling applications, it is well known that cutting by each edge is intermittent as multiple inserts or edges are available on the mill and all sides of the mill are not in contact with the workpiece at all or substantially all times throughout the milling process. As a result, each insert edge is subject to periodic impacts during milling as it makes contact with the workpiece, is stressed and heated during cutting, and then rests and cools until the next impact. Thermal and mechanical fatigue result from this cycling impact and heat. These are a few of the difficulties encountered in milling that are not encountered in turning, or are encountered in such a lesser degree that these are not recognized as relevant. In contrast, turning typically involves a continuous or substantially continuous contact and heating thereby involving a completely different set of design and use factors and concerns.

For these and other reasons, the design of cutting inserts for milling is independent from the design of inserts and cutting edges for other machining such as turning, boring, slotting, etc. One of the current thrusts in milling technology today is a desire to perform as many milling steps with the same mill as possible, that is to be able to perform as many of the following as possible: plunging, ramping, circle interpolating, facing, and end milling with the same mill. Various mills on the market currently attempt to perform at least a few of these steps with an end result of a rough to semi-rough finish. An example of one of these mills is the RPF line of mills from Kennametal such as the one disclosed in U.S. Pat. No. 5,542,795 and those shown in various catalogs including Kennametal Milling Catalog No. 5040 on pages 4 and 182–189 (1995). These RPF mills function to ramp, plunge and/or face mill but typically only provide a rough or semi-finished surface.

One of the current concerns in milling is the stepped or wavy surface on the milled surface resulting from current technology, specifically in the areas of face and end milling. This stepped, uneven or otherwise irregular finish is typically a result of the type, position and location of the cutting inserts. This stepping is particularly relevant in attempts at all-in-one mills, that is mills capable of three dimensional milling, including plunging, ramping, circle interpolating, facing, and end milling with the same mill.

Cutting inserts that are not properly aligned along the flutes of the mill will provide such stepping. For example, on helical mills the inserts must be aligned to follow the curved contour of the helix and any misalignment results in stepping or other irregular finish such as a groove or lip where one insert is radially outward further than adjacent inserts. In addition, cutting inserts that have substantially rectangular configurations (that is, with long, flat cutting edges) will provide such stepping. This stepping is caused by the rectangular configuration of the insert removing excessive material from the workpiece at or approaching the corners of the inserts thereby causing stepping. In contrast, cutting inserts that have an arc-like periphery along its entire cutting surface (radiused corners that extend across the whole cutting edge) remove excess material from the workpiece along the mid-section of the cutting insert, thereby causing valleys.

According to the milling users, this stepped surface is often unacceptable, particularly when a finished, not rough, surface is desired. This stepping is unacceptable because stress points form at each or some of the inner and outer edges of the steps as these edges are often well defined. This forces the milling user to thereafter finish mill the surface which is an additional time consuming and expense-adding step.

Various improvements have been invented in certain specific types of milling, such as finish milling, to diminish or attempt to overcome this stepping, although it is believed that none of these improvements have been provided on so called all-in-one mills. These improvements include rounding the four corners of rectangular cutting inserts as is shown in the above referenced U.S. Pat. No. 5,542,795. Specifically, the rounding of the corners as achieved in the prior art results in a single radii defining the transitions between sides of the insert. This single radii rounding reduces or eliminates the stepped surface with well defined edges, grooves, ridges, etc.

However, these single radii rounded corners and/or the inability to properly position and align all of the inserts along the flute or other surface on the mill still cause the insert to bite excessive material from the workpiece during milling thereby creating a wavy surface having smooth peaks and valleys. The wavy surface is an improvement over the undesirable stepped surface but still presents problems in many applications. Thus these improvements have either reduced the significance of this undesirable stepping, or provide a less significant wavy finish that includes some peaks and valleys but no or minimal sharply defined steps. Milling users have indicated that in many milling applications this rough or semi-finished surface is acceptable with its wavy surface so long as the unacceptable stepping is eliminated since it is the sharp edges of the step that are the significant stress points. For this reason, RPF type cutters have become very popular.

Other cutters have been developed to remove this waviness but such cutters are unique in application. These specialty cutters are for surface finishing only. That is, these cutters are not capable of ramping, plunging, facing and end milling. An example of such a finishing cutter tool is found on Pages 178–179 in Kennametal's Milling Catalog (No. 5040 from 1995). In application, often a drill or other machining device is needed to initially drill a hole, followed by a ramping, slotting or other cutting device for milling out the desired area from the hole, before such a finishing cutter is used. This adds significant time and cost to the operation as multiple milling cutters are needed.

In many applications a rough or semi-finished surface is not sufficient, but the alternative of using multiple milling cutters is undesirable for time and cost reasons. Therefore, it is desirable to improve on the removal of all stepping and as much waviness from the finished milled surface while still providing a milling cutter capable of performing three dimensional milling, that is as many of the needed steps as possible including ramping, plunging, circle or helical interpolating, facing and end milling.

Such improvement continues to be sought by mill users in various industries since such reduction or complete elimination of all stepping and waviness will increase the overall life of the metal end product by reducing and/or eliminating stress, fatigue and other undesirable forces working against the metal end product. In conjunction with this, if such milling cutter could perform all or substantially all of the typical milling steps including ramping, plunging, circle interpolation, facing and end milling, then significant cost and time reduction would also be achieved. Finally, if all such milling steps could be achieved by one milling cutter, the cutter must have a reasonable life as these various steps involve different concerns and factors including the subjecting of the cutter to large axial, radial, and tangential forces, possibly simultaneously.

SUMMARY AND OBJECTS OF THE INVENTION

It is an objective of the invention to provide an improved milling tool and/or inserts that are capable of three dimensional milling which may include such milling steps as ramping, plunging, circle or helical interpolating, facing, and/or end milling or shoulder cutting.

It is further an objective of the invention to provide a milling tool and/or inserts that produce a milled surface having at least one of substantially improved peak and valley control, a lack of stepping in the form of edges, grooves, ridges, etc., and/or minimized waviness by minimizing the distance between the peaks and valleys.

It is further an objective of the invention to provide a milling tool and/or inserts that mills with minimal excessive material biting of the workpiece.

It is a further objective of the invention to provide such a milling tool configured as a helical end mill.

It is further an objective of the invention to provide such improved cutting inserts which have modified corners and edges which are defined by multiple radii for optimizing the transition between inserts and smoothing off the peaks in the workpiece, and a flat or crown area for minimizing excessive material removal from the workpiece that generally results in valleys.

It is further an objective of the invention to provide such an improved milling tool with two types of inserts, namely at least one plunging insert and at least one cutting insert.

It is further an objective of the invention to provide such an improved milling tool with at least two rows of cutting inserts, the inserts in each row being offset from the inserts in the other row when observed from any radial and perpendicular plane taken through the tool with reference to the central axis.

Other objectives and advantages of the present invention will become apparent and obvious from a study of the following description and the accompanying drawings which are merely illustrative of such invention.

Accordingly, these and other objectives and advantages are met by the embodiments of the invention as summarized below. In a preferred embodiment of the present invention, a milling cutter for three dimensional milling, comprising of a plurality of cutting inserts, each of which includes front and back faces, at least two opposing side walls, at least two opposing end walls, radiused corners joining said side and end walls, at least one cutting edge defined at an intersection between said front face and the combination of one of said side walls and any radiused corners adjacent thereto, wherein each of the cutting edges is defined to include a flat portion between the radiused corners where each of the radiused corners is defined by at least a two radii and a milling body with a central axis therein, the milling body having a plurality of insert seats whereby at least one of the plurality cutting inserts is securably seated in at least one of the insert seats. A milling insert for use in milling, comprising of a front and back face generally opposing each other, at least two opposing side walls, at least two opposing end edges, radiused corners joining said side walls and end edges, and at least one milling edge defined at an intersection between said front face and the combination of one of said side walls and any radiused corners adjacent thereto, wherein milling edge is defined to include a flat portion between a radiused edge where each of the radiused edges is defined by at least a two radii.

BRIEF DESCRIPTION OF THE DRAWINGS

Similar or like numerals are used to point out similar or like elements in related drawings.

DETAILED DESCRIPTION OF THE INVENTION

Figure 1:
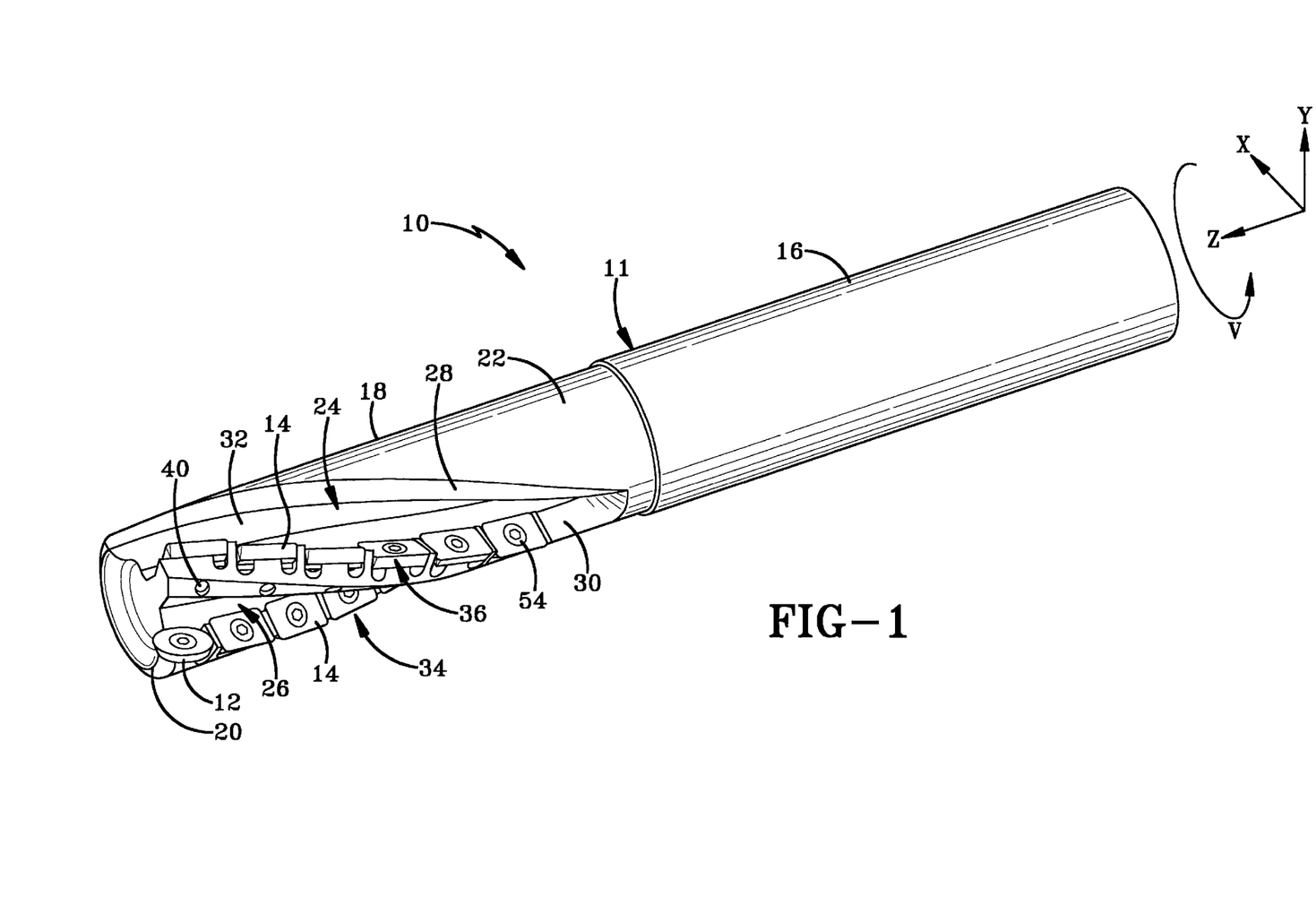
FIG. 1 shows an isometric view of one embodiment of the present invention, the embodiment being an improved cutting tool shown in this drawing in a helical end mill environment with improved cutting inserts thereon.
Figure 2:
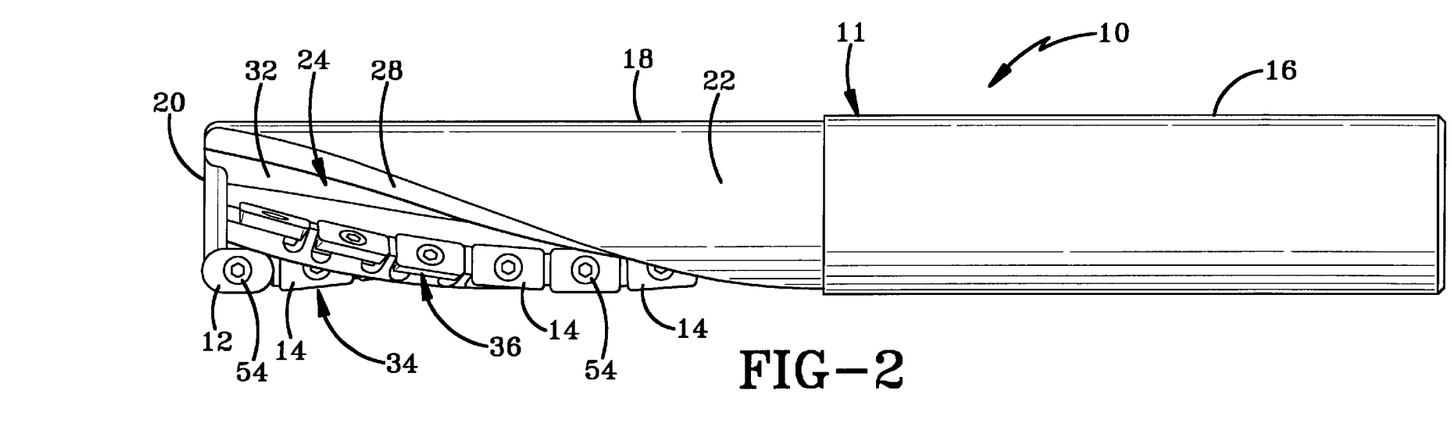
FIG. 2 shows a side elevational view of the helical end mill of the FIG. 1 with cutting inserts thereon including the improved cutting inserts of the present invention.
Figure 3:
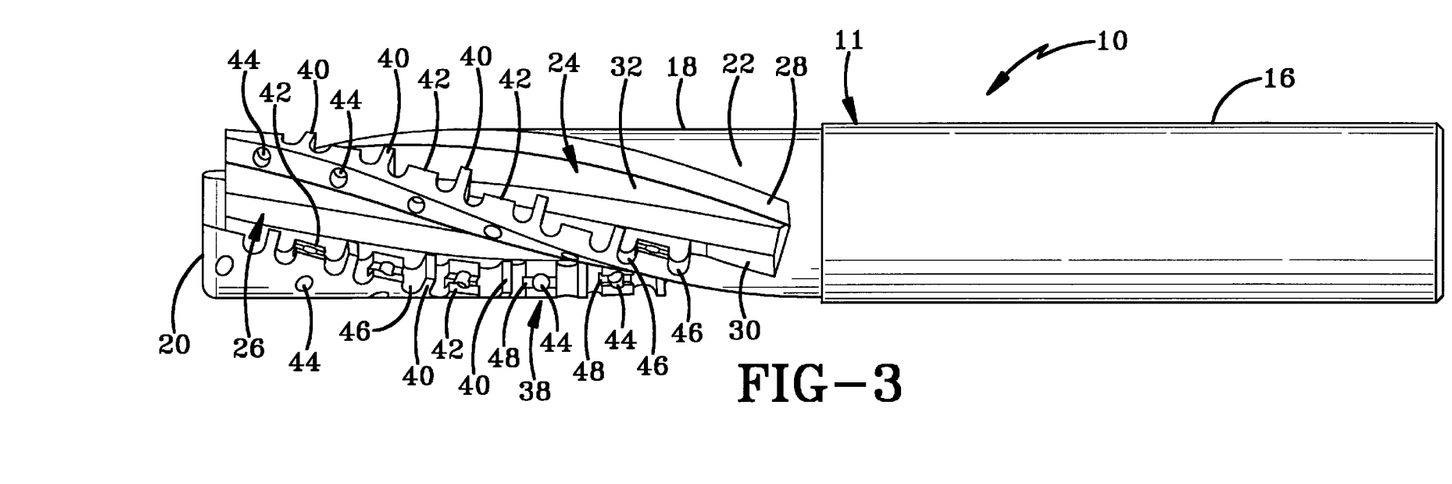
FIG. 3 shows a side elevational view of the helical end mill shown in FIG. 2 except the cutting inserts are removed.
Figure 4:
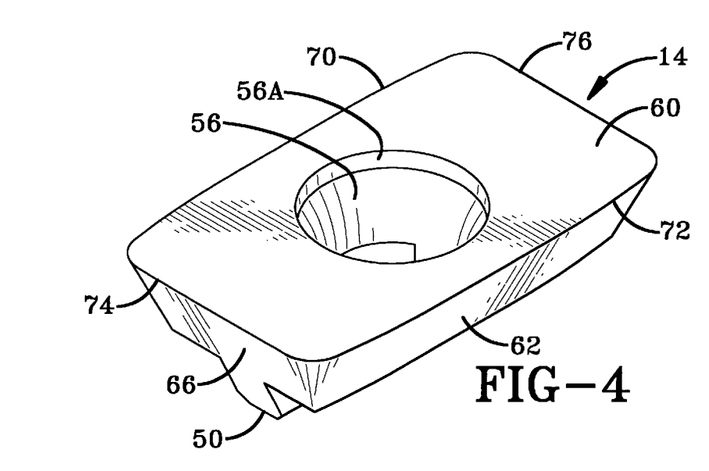
FIG. 4 shows an isometric view of one embodiment of one of the cutting inserts of the present invention as shown in FIG. 1.

Referring now to the drawings, the present invention is shown in FIGS. 1–3 as an improved milling cutter and indicated generally by numeral 10. Specifically, the present invention as shown in FIGS. 1–2 is the improved milling cutter 10 including a milling body 11 with improved cutting inserts 12 and 14 (in any of the embodiments disclosed in FIGS. 4–27 including the nominal variations in FIGS. 20–23 indicated as 12', 12", 12''', and 14', and the more drastic variations in FIGS. 24 and 25 indicated as inserts 200 and 300) attached thereto. The improved milling cutter body 11 is embodied as a helical end mill which includes the plurality of improved cutting inserts including a plunging insert 12 and general milling inserts 14 for ramping, circle interpolating, facing and end milling. These improved inserts 12 and 14 are designed for use in any type of milling although are only shown in the FIGS. in a helical end mill embodiment. In addition, several of the concepts described below on the helical mill including overlapping inserts by offsetting, staggering or other methods are also designed for use on other types of mills.

Milling cutter body 11 as best shown in FIG. 3 is of an elongated and generally cylindrical shape. The milling cutter body 11 comprises a shank 16 and a head 18. The shank 16 is configured so as to be capable of insertion and securing within the spindle of a milling machine (not shown) as is well known in the art. The shank may be of any shape or design so as to be capable of this insertion and securing. Such designs include but are not limited to V-flange, taper, shell mill mount, and Weldon shank.

The head 18 is generally a cylindrical or substantially cylindrical body or shaft extending axially from the shank 16 to an end face 20 thereby defining an exterior surface 22 therebetween. The exterior surface 22 of the head 18 preferably includes a plurality of helical grooves 24 and 26 (two grooves in the embodiment shown although other numbers of helical grooves are contemplated by the invention). Each groove 24 and 26 is preferably cut into the exterior surface 22 in a helical or spiral manner that extends from the end face 20 to substantially the shank 16. More specifically, each groove includes a pair of opposing faces, specifically a leading face 28 and a trailing face 30, defining a carved out flute area therebetween as best shown in FIG. 3. The leading face 28 and trailing face 30 may either intersect at the radially most inward portion of the flute (thus defining a generally V-shaped cross section to the flute), or alternatively, as is shown in the FIGS., a base face 32 may connect the leading and trailing faces (thus defining a generally U-shaped cross section to the flute).

Each leading face 28 and trailing face 30 spirals along the exterior surface 22 where each face 28 and 30 at any cross sectional point thereon is substantially radial to the central axis of the substantially cylindrical shank 16. The trailing face 30 of each groove 24 and 26 includes a grouping of inserts 34 and 36, respectively, as shown in FIG. 1, where the inserts on adjacent trailing faces are generally staggered along the longitudinal axis of the shank 16 to assure no cutting gaps between inserts. Therefore, two helical groupings of inserts 34 and 36 as staggered assure one effective cutting flute.

As best shown in FIG. 3 and in accordance with one of the features of the invention, a plurality of cutting insert seats 38 are located along each trailing face 30 and are spaced apart by spacers 40 which provide a rigid surface against which the short edges of the inserts may rest for supporting an insert and prohibiting twist of the insert. Each cutting insert seat 38 includes a mounting lug 42 with a threaded hole 44 therein. On each side of each lug 42 is a valley 46. Each of the lugs 42 includes a longitudinal slot or pocket 48 therein extending inward into the lug and between the valleys 46 on each side of the lug.

In accordance with one of the features of the invention, each insert has a rail 50 formed therein. The rail, as best shown in FIGS. 7–10 and 15–18, is an elongated rib extending lengthwise along a back face 52 of the insert. The rail generally has chamfered edges and typically corresponds almost identically in size and shape to the slot 48 as the tolerances of the fit within the slot are critical. The tolerances of both the slot and rail are ±0.0005 of an inch or better, as are the tolerances between one edge of the rail to an opposing outer edge of the insert. (The actual dimensions of one example of an insert, rail and mill are given below.)

The rail 50 as shown in the displayed and preferred embodiment extends the full or substantially full length of the back face of the insert as best shown in FIGS. 7, 9, 15 and 17. The taper of the insert on the end surfaces as described below in more detail continues to the outermost or bottom face 51 of the rail.

The rail 50 further includes a pair of opposed sides 53 extending between the tapered end surfaces that extend from the insert end surfaces as described below. The sides 53 transition into the bottom face 51 at angled edges 55 which are generally between 1° and 89°, and more preferably approximately 40° to 50°.

The rail and slot design may alternatively be of any of a number of designs including, for instance, the design of the rails in U.S. Pat. No. 5,542,795. However, it is critical that such design provide a secure seat to prohibit radial motion and assure accurate positioning of the insert.

Each of the seats 38 receives a cutting insert such as insert 12 or 14. Specifically, on the back face 52 of each insert is the corresponding complimentary integrally formed rail 50 that mates with the slot 48. After the rail 50 is seated or mated in the slot 48, the insert is tightly secured to the lug 42 by a fastener 54 (shown in FIG. 2) such as an allen or torx screw that passes through a clearance hole 56 in the cutting insert 12 or 14 and threads into the threaded hole 44. The clearance hole 56 includes a tapered counterbore 56A which is engaged by a corresponding tapered surface on the head of the locking fastener 54, thereby allowing the insert to be tightly secured to the seat 38 as the fastener 54 pushes downward against the tapered counterbore 56A.

In the embodiment shown, one pair of helical groupings of inserts 34 and 36 is shown. The helical grouping 34 is the lead grouping as it includes both plunging and general milling type inserts 12 and 14 (or 12', 12" 12''' or 14' as described below). The helical grouping 36 is a follower grouping which only includes general milling type inserts 14 (or 14').

Figure 27:
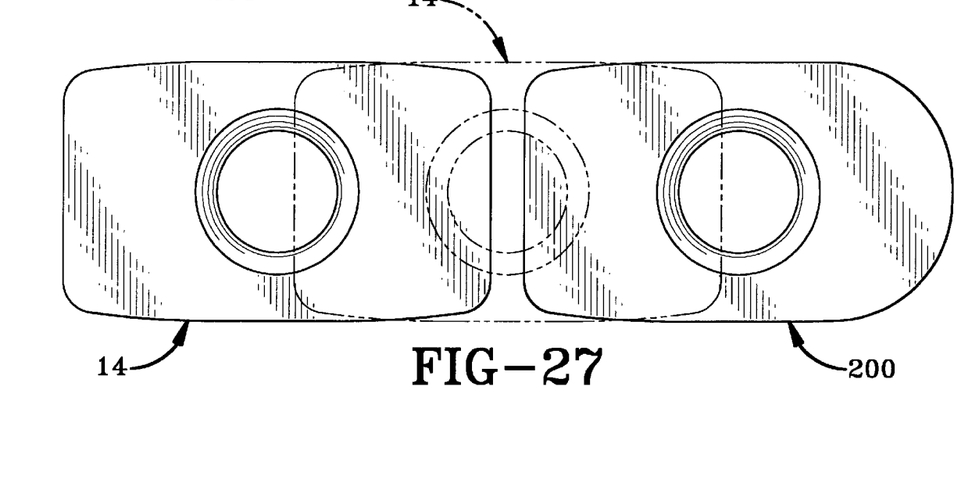
FIG. 27 is a view of several inserts unwound from the helical configuration to show the overlap caused by the stagger where one helical grouping is shown with an insert from another helical group drawn in phantom over the first group.

As described above and in accordance with one of the features of the invention, the inserts in adjacent groupings are staggered, that is in any given cross sectional plane through the shank 16, the inserts on grouping 34 overlap and preferably start and end in the mid-section of one of the inserts in grouping 36 as is best shown by the inserts toward the end face 20 in FIG. 2. Although this staggering may be of any overlap, it is preferred that the overlap is from substantially mid-point of an insert in grouping 34 or 36 with the spacer 40 adjacent another insert in the other grouping 36 or 34, respectively. Basically, it is preferable that the mid point of any given insert is centered between the inserts in the adjacent helical grouping as this provides the best peak shaving on the milled surface. This overlapping or staggering is best shown in FIG. 27 where a portion (two inserts) of one helical grouping is shown with a portion (one insert) from an adjacent helical grouping shown in hidden lines on top of the one grouping.

Plunging type insert 12 is best shown in FIGS. 12–19 while general milling insert 14 is best shown in FIGS. 4–11. These inserts are preferably arranged such that the improved plunging insert 12 (or 12', 12", 12''', 200, 300, as described below) is preferably used as the lead insert on lead helical grouping 34 while milling inserts 14 (or 14', as described below) are preferably used as follower inserts on lead helical grouping 34 and as preferably every insert on follower helical grouping 36 (see FIGS. 1–2). No plunging insert 12 is needed on the follower helical grouping 36 as the outermost insert thereon, that is the one closest to the end face 20, is offset longitudinally inward and thus not used to plunge as best shown in FIG. 2. This longitudinally inward positioning is provided to supply the needed staggering to provide a more finished milled surface. It is however recognized that the inserts 12 and 14 are usable in other locations in either helical grouping or by itself outside of any grouping. It is further recognized that the use of the inserts 12 and/or 14 in any combination may be on any type of milling tool and not just on helical end mills. It is also recognized that variations of these inserts may be used.

In the displayed embodiment of FIGS. 4–11, cutting insert 14 is approximately rectangular in general shape and includes a front or top surface 60, a pair of tapered side surfaces 62 and 64, a pair of tapered end surfaces 66 and 68, the base surface or back face 52, and the integrally formed rail 50 extending outward from the base surface 52. The top surface 60 includes principally four edges, namely a pair of opposed and spaced apart long edges 70 and 72 a pair of opposed and spaced apart short edges 74 and 76.

At least one of the edges 70,72,74,76 is a cutting edge, and preferably at least the two long edges 70 and 72 are cutting edges thereby allowing the insert to be indexable. In an alternative embodiment, the cutting inserts are generally square and thus all of the edges are the same length and are preferably each a cutting edge thereby allowing for complete indexability of the insert. Other shapes of inserts are contemplated including generally triangular inserts.

In contrast, cutting insert 12 is approximately oval in general shape, as best shown in FIGS. 12–19. Similar to the insert 14, cutting insert 12 includes a front or top surface 80, a pair of tapered side surfaces 82 and 84, a pair of tapered end surfaces 86 and 88, the base surface or back face 52, and the integrally formed rail 50 extending outward from the base surface 52. The top surface 80 includes principally four edges, namely a pair of opposed and spaced apart long edges 90 and 92 and a pair of opposed and spaced apart short edges 94 and 96.

At least one of the edges 90,92,94,96 is a cutting edge, and preferably at least the two long edges 90 and 92 are cutting edges thereby allowing the insert to be indexable. In an alternative embodiment, the cutting inserts are generally round and thus all of the edges are the same length and are preferably each a cutting edge thereby allowing for complete indexability of the insert. Once again, other shapes of inserts are contemplated as described above.

Figures 5, 6, 7, 8:
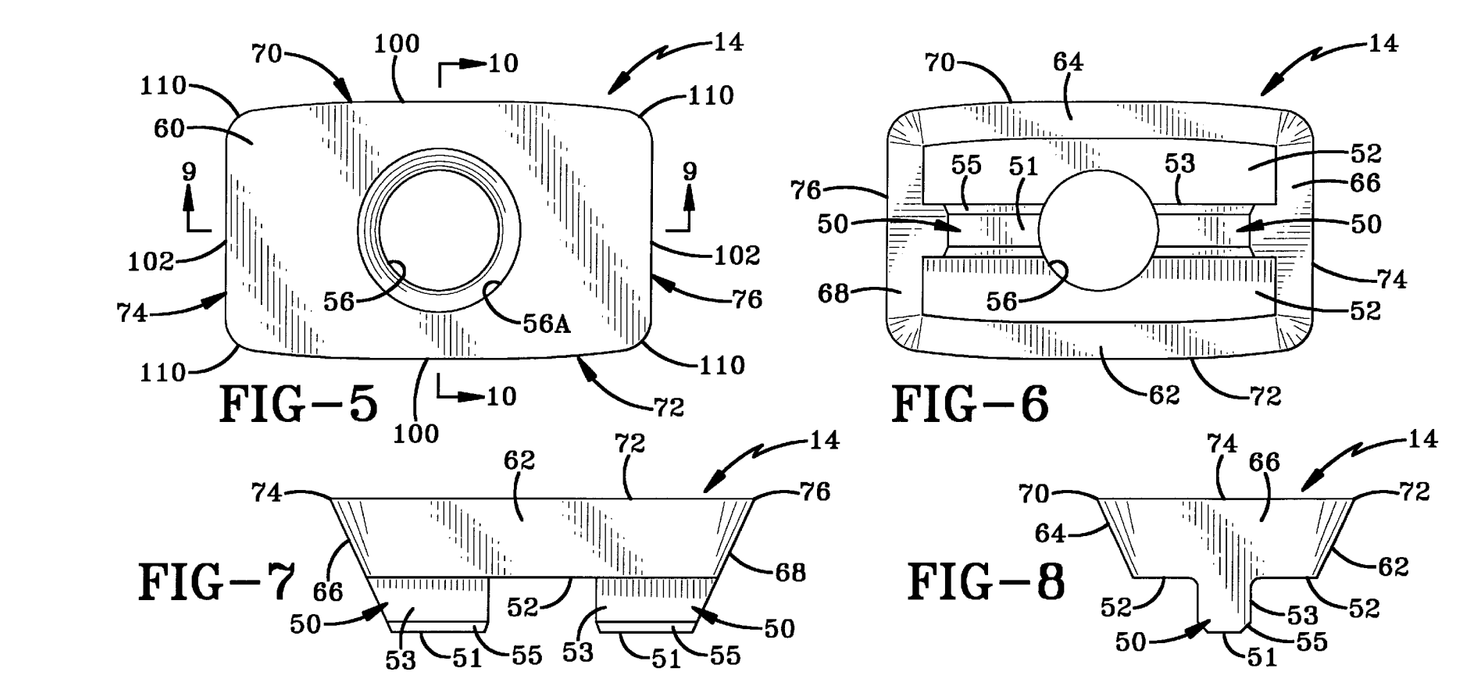
FIG. 5 shows a top plan view of the cutting insert of FIG. 4.
FIG. 6 shows a bottom plan view of the cutting insert of FIG. 4.
FIG. 7 shows a side elevational view of the cutting insert of FIG. 4.
FIG. 8 shows an end elevational view of the cutting insert of FIG. 4.
Figure 9:
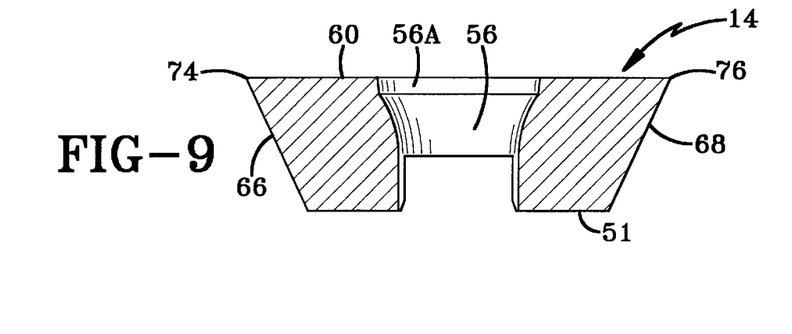
FIG. 9 is a sectional view of the cutting insert of FIG. 4 taken along line 9—9 in FIG. 5.
Figure 10:
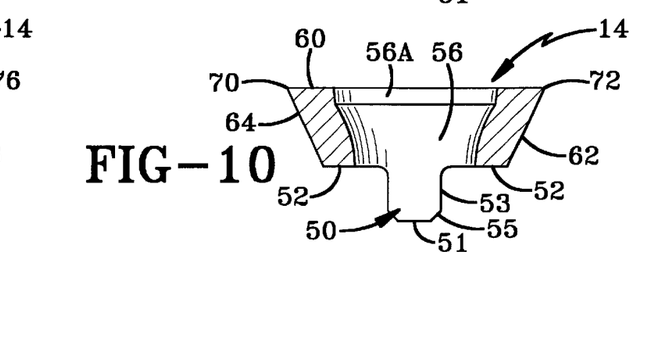
FIG. 10 is a sectional view of the cutting insert of FIG. 4 taken along line 10—10 in FIG. 5.
Figures 13, 14, 15, 16:
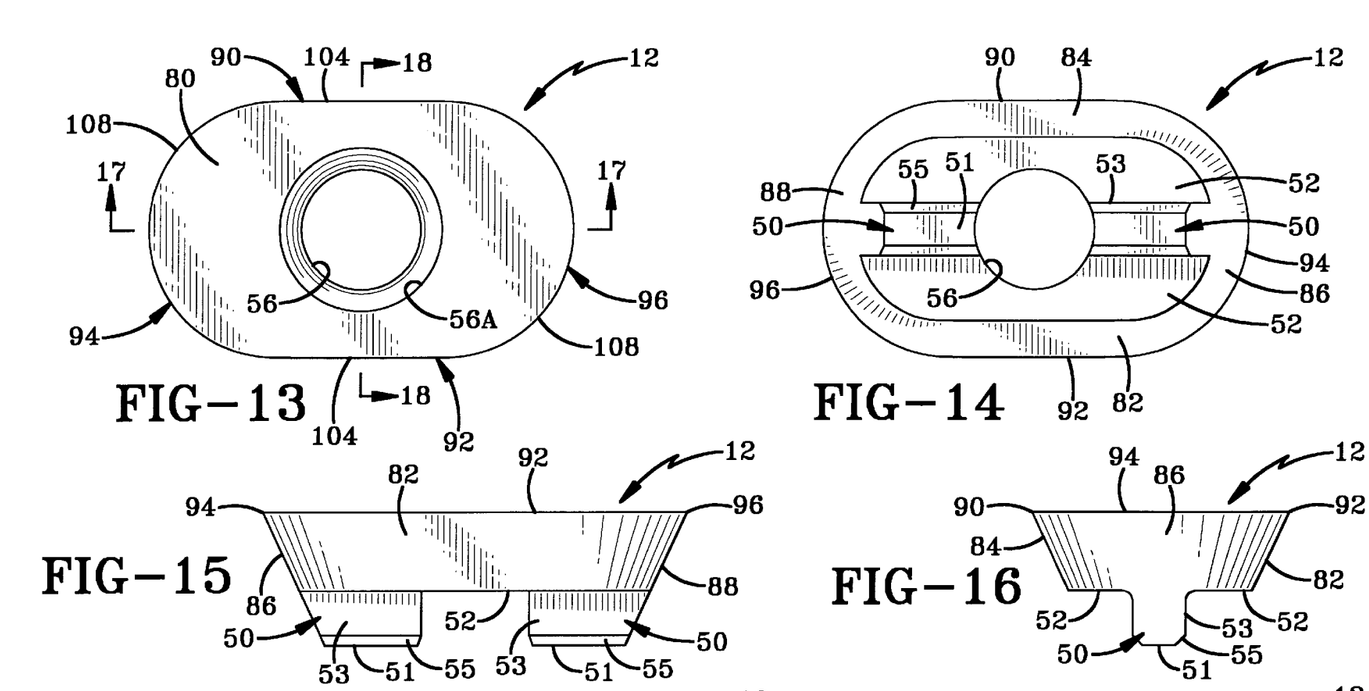
FIG. 13 shows a top plan view of the cutting insert of FIG. 12.
FIG. 14 shows a bottom plan view of the cutting insert of FIG. 12.
FIG. 15 shows a side elevational view of the cutting insert of FIG. 12.
FIG. 16 shows an end elevational view of the cutting insert of FIG. 12.
Figure 17:
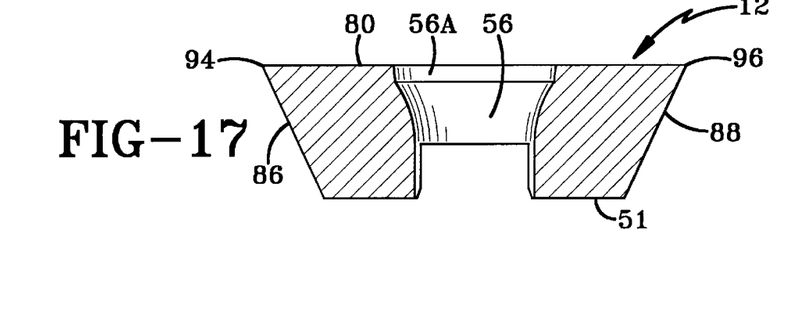
FIG. 17 is a sectional view of the cutting insert of FIG. 12 taken along line 17—17 in FIG. 13.
Figure 18:
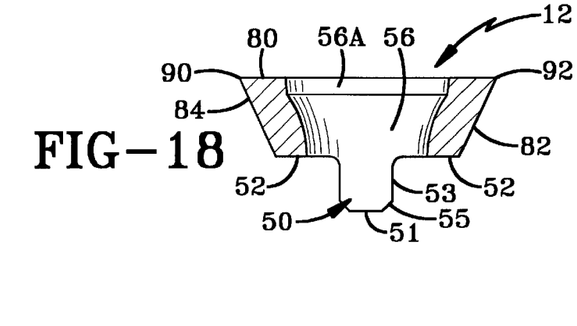
FIG. 18 is a sectional view of the cutting insert of FIG. 12 taken along line 18—18 in FIG. 13.

In accordance with one of the principal features of the invention, each of the two cutting edges 70,72 on insert 14 and 90,92 on insert 12 are defined by a flat mid-section and a rounded or radiused corner at each end thereof that transitions the edge 70, 72, 90, 92 into an adjacent edge 74, 76, 94, 96. Specifically in contrast to the prior art in which the edges are radiused entirely from one edge to another, these edges include a flat or crown portion, namely flat 100 on edges 70 and 72, and flat 104 on edges 90 and 92. On insert 14 as best shown in FIG. 5, the flats 100 are on the long sides 70 and 72 in between rounded or radiused corners 110. Similarly on insert 12 as best shown in FIG. 13, the flats 104 are on the long sides 90 and 92 in between rounded or radiused corners 108.

This crown or flat provides several advantages. First, this flat functions when cutting to mill off the peaks left by other inserts thereby providing a more finished and generally planar surface. Second, this flat provides an accurate and uniform surface from which to determine the location of the rail during manufacture since the creation of the rail from a curved surface is generally not accurately possible (and the rail position, size and shape is critical as the insert's accurate location within the seat of the milling tool is critical to the surface finish).

Figure 11:
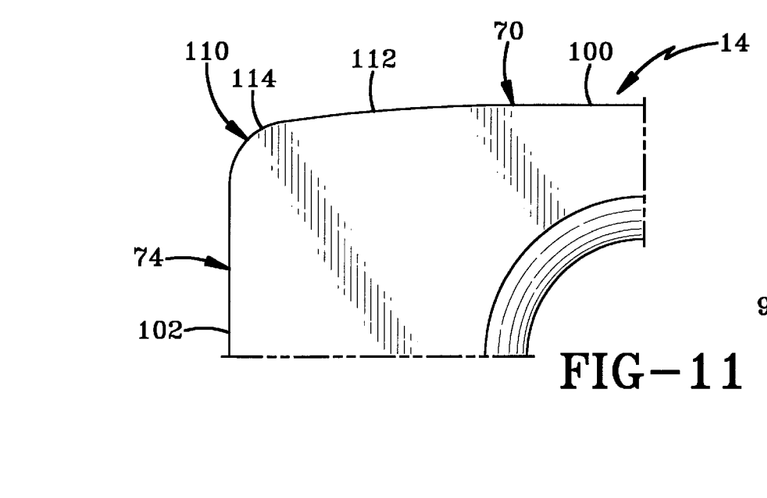
FIG. 11 shows a fragmentary enlarged plan view of a ¼ portion of the cutting insert of FIG. 4.
Figure 12:
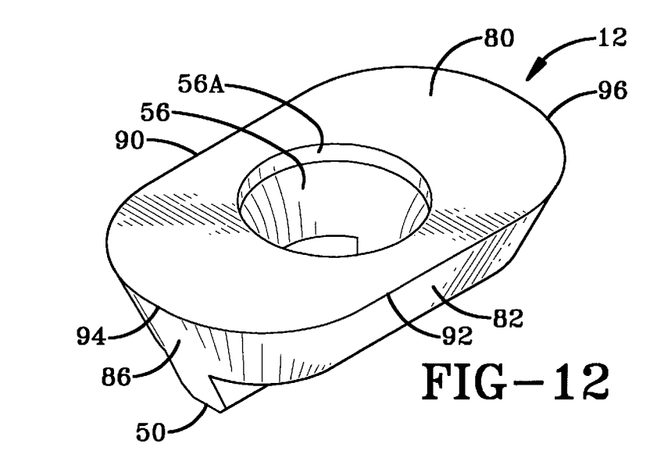
FIG. 12 shows an isometric view of another embodiment of one of the cutting inserts of the present invention as shown in FIG. 1.
Figure 19:
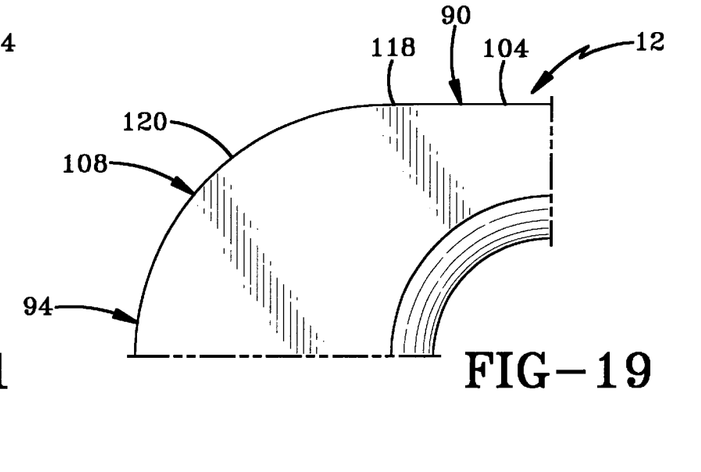
FIG. 19 shows a fragmentary enlarged plan view of a ¼ portion of the cutting insert of FIG. 12.

In accordance with another of the principal features of the invention, the rounded or radiused corners 108 and 110 are defined by two radii resulting in each corner being a first curved section of a first radius blending into a second curved section of a second radius. Specifically as best shown in FIG. 11, each ¼ quadrant of insert 14 includes one-half of the long flat 100, a first curved section 112 of a first radius, and one-half of a second curved section 114 of a second radius of a shorter determining length than the first radius. Similarly as best shown in FIG. 19, each ¼ quadrant of insert 12 includes one-half of the long flat 104, a fourth curved section 118 of a third radius, and one-half of a fifth curved section 120 of a fourth radius of a shorter determining length than the third radius.

As a result of this construction, each cutting edge 70,72, 90,92 extends from a radiused corner to a radiused corner with a flat therebetween. This is best shown in FIGS. 11 and 19. Specifically, long cutting edges 70 and 72 are defined from the sharp second curved section 114 at one corner blended into the first more sweeping curved section 112 blended into the long flat 100 blended into another first more sweeping curved section 112 blended into another sharp second curved section 114 at an adjacent corner. This general sharp radiused portion, sweeping radiused portion and flat scheme is repeated on the cutting edges of the other insert also, and more specifically the long cutting edges 90 and 92 are defined from the sharp fifth curved section 120 at one corner blended into the fourth more sweeping curved section 118 blended into the long flat 104 blended into another fourth more sweeping curved section 118 blended into another sharp fifth curved section 120 at an adjacent corner.

The repeating of the flat, sweeping radius, and sharp radius scheme results in insert 12 of FIGS. 12–19 having the following edge construction: around its periphery, flat 104, sweeping curved section 113, less sweeping or sharper corner curved section 120, another less sweeping sharper corner curved section 120, another sweeping curved section 118, another flat 104, still another sweeping curved section 118, still another less sweeping or sharper corner curved section 120, yet another less sweeping or sharper corner curved section 120, and yet another sweeping curved section 118 to reach the flat 104 where this description started. Similarly, the repeating of the flat, sweeping radius, and sharp radius scheme on insert 14 of FIGS. 4–11 defines the following edge construction around its periphery: flat 100, sweeping curved section 112, sharp corner curved section 114, a short flat 102, another sharp corner curved section 114, another sweeping curved section 112, another flat 100, still another sweeping curved section 112, still another sharp corner curved section 114, another short flat 102, yet another sharp corner curved section 114, and yet another sweeping curved section 112 to reach flat 102 where this description started.

Figure 20:
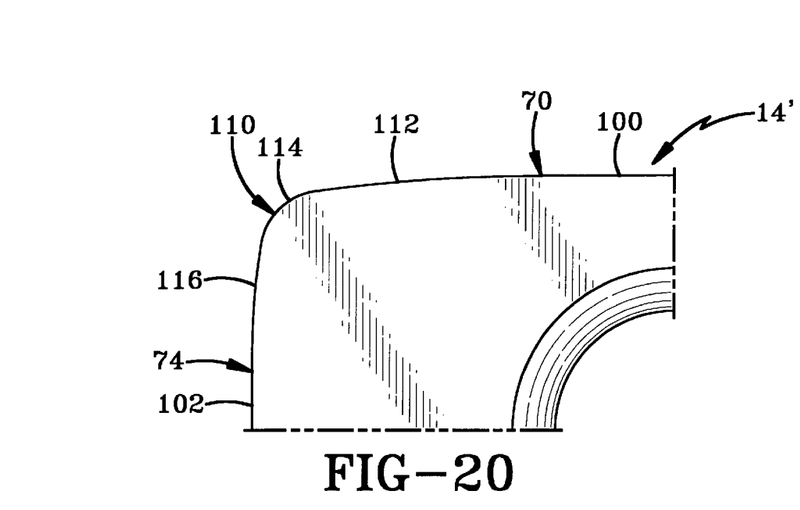
FIG. 20 is a second embodiment of the cutting insert in FIGS. 4–11.

Still other embodiments of cutting inserts 12 and 14 are contemplated as shown in FIGS. 20–25. Specifically, another embodiment of insert 14 is shown in FIG. 20 as insert 14' where an additional radiused portion exists along each radiused corner 110. Insert 14' includes an additional or third curved section 116 with the same radius as the first curved section 112. As a result, each radiused corner 110 includes the first (sweeping) curved section 112, the second (sharp) curved section 114, and the third (sweeping) curved section 116. The sharp curve or radiused section is thus surrounded on each side by sweeping curved or radiused sections. Alternatively on insert 14 or 14', the short flat 102 could be removed, leaving the short edge 74 of a curved contour from sharp curved sections 114 on insert 14 or from sweeping curved sections 116 on insert 14'.

Figure 21:
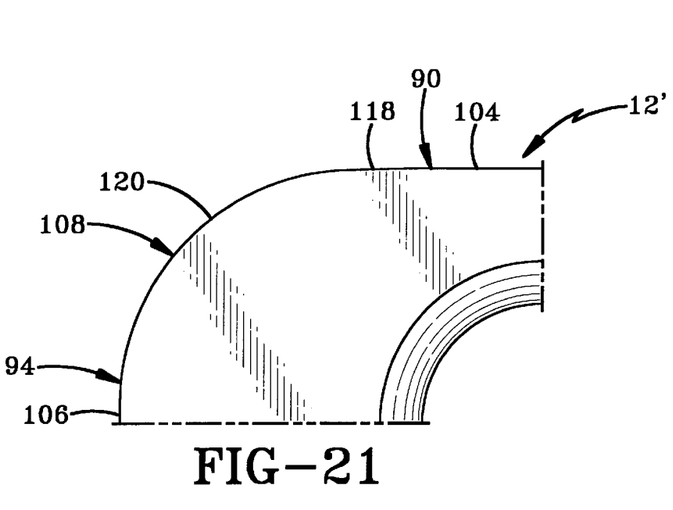
FIG. 21 is a second embodiment of the cutting insert in FIGS. 12–19.

Another embodiment of insert 12 is shown in FIG. 21 as insert 12'. Insert 12' is the same as insert 12 except short flats 106 are added in between the sharp curved section 120 along short edges 94.

Figure 22:
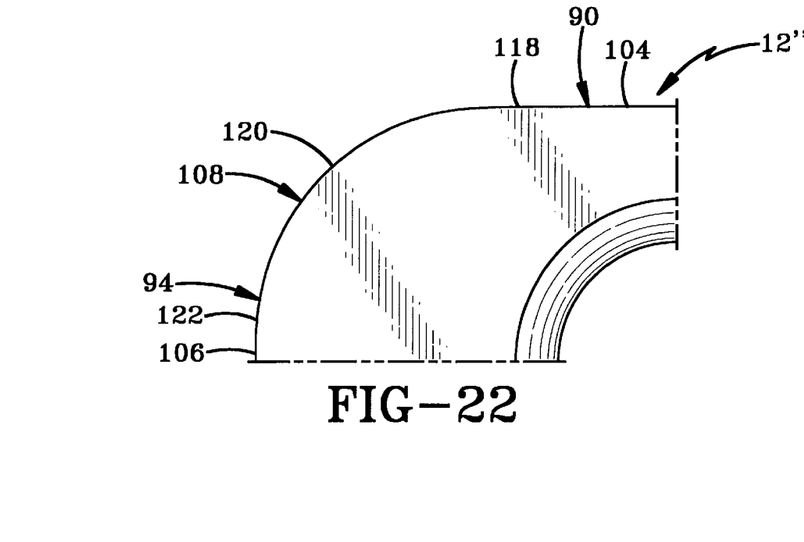
FIG. 22 is a third embodiment of the cutting insert in FIGS. 12–19.

An even further embodiment of insert 12 is shown in FIG. 22 as insert 12". Insert 12" is the same as insert 12' except an additional sweeping curved section 122 is also added to each radiused corner 108. Specifically, each radiused corner 108 includes the fourth (sweeping) curved section 118, the fifth (sharp) curved section 120, and the sixth (sweeping) curved section 122. Basically, the flats 104 and 106 are connected by this multiple radiused corner 108 with a sharp center curve 120 separated by sweeping curves 118 and 122.

Figure 23:
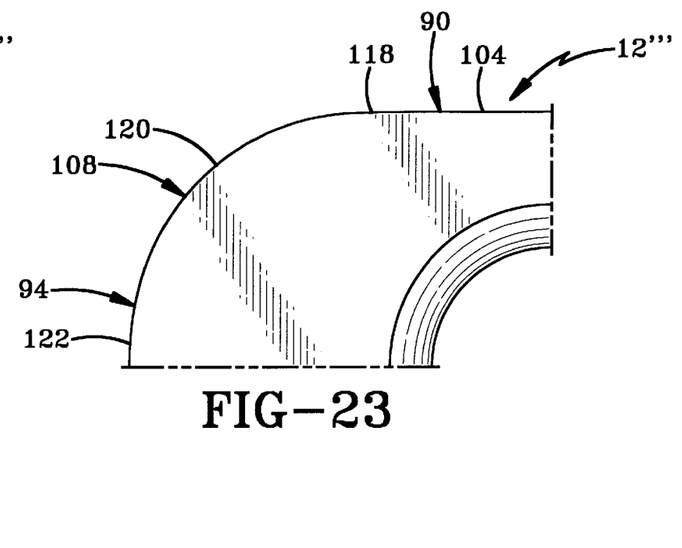
FIG. 23 is a fourth embodiment of the cutting insert in FIGS. 12–19.

Yet another embodiment of insert 12 is shown in FIG. 23 as insert 12'''. Insert 12''' is the same as insert 12 except an additional sweeping curved section 122 as described in the preceding paragraph is added.

Figure 24:
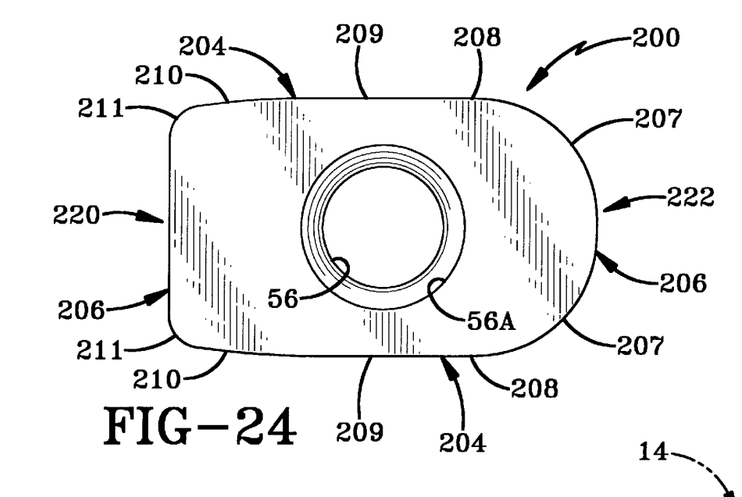
FIG. 24 shows a top plan view of an even further embodiment of one of the cutting inserts of the present invention as shown in FIG. 1.

Additionally, more drastically modified embodiments are also contemplated. One such embodiment is shown in FIG. 24 as insert 200. Insert 200 is a modified plunging insert which is not indexable. Insert 200 is a combination of plunging insert 12 and milling insert 14. Specifically, insert 200 is a combination of one end of insert 12 with one end of insert 14. (Alternatively, the insert 200 may be any combination of inserts 12, 12', 12", 12''', 14 and 14'.) As a result, the insert 200 has plunging features due to the more rounded corners 208 while also having better finish milling properties due to the flat and corner 210 properties of the other end.

Specifically, insert 200 as shown in FIG. 24 includes four edges, namely two long edges 204 and two short edges 206. The long edges 204 extend from a relatively sharp radiused section 207 through a sweeping radiused section 208 through a flat 209 through a sweeping radiused section 210 to a sharp radiused section 211. The short edges 206 extend between its respective corners of 211 or 207/208, depending upon whether it is the milling end 220 or plunging end 222, respectively. The details of the edges including the flats and radiused corners may be any of the above described embodiments and specifically any of the embodiments shown in FIGS. 4–11 or 20 for the milling end 220 and any of the embodiments shown in FIGS. 12–19 or 21–23 for the plunging end 222.

Figure 25:
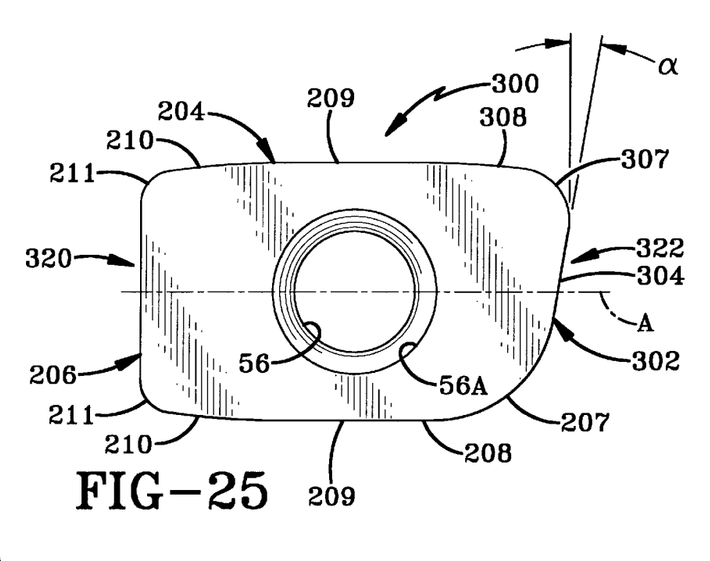
FIG. 25 shows a top plan view of yet another embodiment of one of the cutting inserts of the present invention as shown in FIG. 1.

An additional variation of insert 200 is shown in FIG. 25 as insert 300 as a non-indexable insert of a left hand design (a right hand is contemplated and well understood by one of skill in the art). On insert 300, milling end 320 is the same as 220 on insert 200; however, plunging end 322 has an angled or transverse plunging face 302 rather than a substantially perpendicular plunging face to the longitudinal axis A as in end 222 in the previously described inserts, including 12, 14, and 200. This angle is α and in the displayed embodiment is 3° although it may vary from less than 1° to over 10° or 20°.

On face 302, one of the radiused corners is the same or similar as on insert 200 and is indicated on FIG. 25 as 207 and 208. At the intersection of this radiused corner 208 with axis A, an angled flat 304 is defined which extends to smaller radiused corner 307. This corner 307 arcs through sweeping section 308 into flat; 209.

The construction of the edges of the inserts is based on the concept that the flats are flat lines or edges that area parallel to or substantially parallel to the corresponding axis, that is the long flats are parallel to the longitudinal axis and the short flats, if any, are parallel to the transverse axis that is perpendicular to the longitudinal axis. The long or sweeping curved sections in each radiused corner (including 112, 116, 118, 122) are determined by a radius of an arc where the central point of the arc is outside of the insert and along an opposing axis, that is the central point for determining the arc for a long curve section adjacent a long flat is a point along the transverse axis outside of the insert. The short or sharp curved sections in each radiused corner (including 114, 120) are determined by a radius of a second arc where the central point of this second arc is inside of the insert at a point that provides for smooth transitions of one adjacent long arc into one of another adjacent long arc, an adjacent short flat, or another adjacent short arc.

Figures 26, 26A:
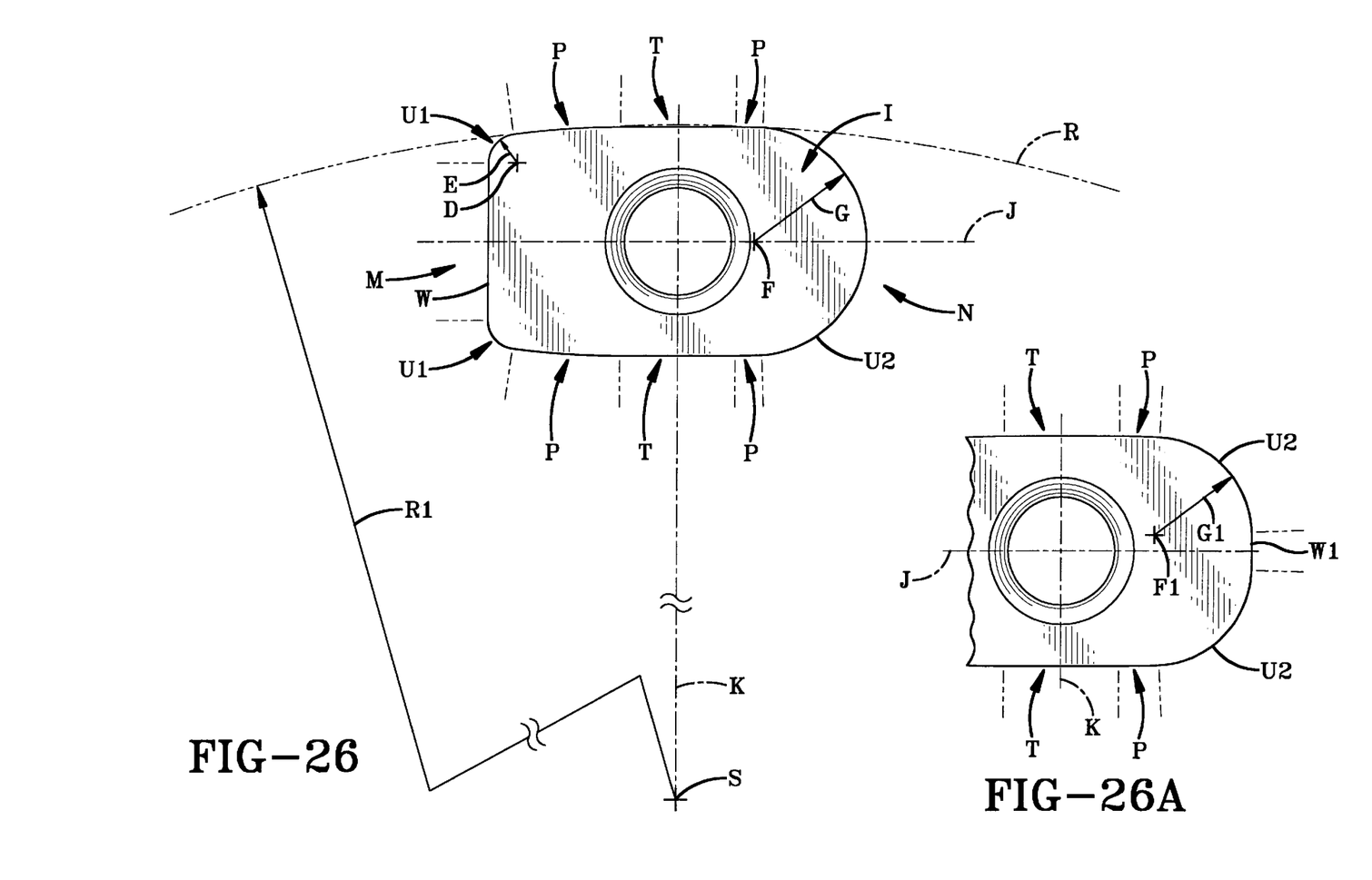
FIG. 26 is a view of the insert of FIG. 24 showing the various design constraints.
FIG. 26A is a modified fragmentary view of the plunging end of FIG. 26 with a flat added.

One example of the construction specifics is shown in FIG. 26 in an exaggerated format. An insert is shown of the embodiment displayed in FIG. 24 where the flats and radii are indicative of the above-described designs. The insert is I and it has a longitudinal (major) axis J and second (minor) axis K. One end M of the insert is of a milling design while the other end N is of a plunging design.

A long or sweeping curved section P exists on each of the long edges of the insert. These sections are defined on each side of the longitudinal axis J by an arc R (only shown on one side in FIG. 26 for clarity) that extends from a center point S on the minor axis K a set distance defined by line R1. Along the long edges of the insert, the arc R is sliced away approximate the arc's intersection with the minor axis K by long flats T. The arc R is also sliced away by sharply rounded corners provide transitions into the side or short edges W (this very sharply rounded corner is U1), or into another rounded corner (this less sharply rounded corner is U2 and is for plunging). The sharply rounded corners U1 and U2 are a result of small arcs extending from points D and F within the insert to define sufficient curvature to transition sections (or in the case of this plunging end, to round off the whole end). A plurality of pairs of dashed lines extend outward from the outer edge of the insert to indicate the scope of each of the sections. Also, FIG. 26A shows the design adjustment needed to add a flat W1 to the plunging end (move point F to F1, thus altering arc G to G1).

One example of an actual insert of this embodiment (as shown in FIG. 26) is as follows: The insert I is an insert with an overall length along the axis J of 0.625±0.001_inch and an overall width along the axis K of 0.375±0.002. In addition, the height of the total insert including rail is 0.190 to 0.195 inch while the height without the rail is 0.115±0.001 inches. The rail is 0.0774 inches wide and has rounded outer edges (55 in FIGS. 7–10 and 15–18) at a 45° angle with transition inner edges of a 0.015 radius that transition from side 53 to base 52 in FIGS. 7–10 and 15–18. The taper of the sides (whereby the sides on insert I are identical to those on inserts 12 and 14, namely sides 62, 64, 66, 68 on insert 14 and for 82, 84, 86, 88 on insert 12) is 25° all around the insert. The hole in the center of the insert has a 0.170 to 0.176 inch diameter at the rail and tapers out to a 0.233 to 0.239 inch along or near the top surface of the insert.

The specifics of the cutting edge are as follows: The flats T are 0.190 inch in length and are parallel to each other and axis J. On each side of each flat T along the cutting edge are sweeping curve sections P which are defined by the intersection of arc R as defined by line R1 with the flat T. The line R1 in this example has a center point 6 inches away on minor axis K at point S and extends to define arc R. In the case of plunging end N, the sweeping curve P is short and transitions into sharply curved section U2 which is defined by arc forming line G with a radius of 0.175 inch extending from point F. In the case of milling end M, the sweeping curve P is longer and transitions into very sharply curved section U1 which is defined by arc forming line E with a radius of 0.047 inch extending from point D. It is critical that the transitions between flat T and sweeping curves P, and between curves P and sharp curves U1 and U2 be smooth and at the intersection of the arcs defined thereby.

The mill body in this example is manufactured of metal such as steel, while the inserts are manufactured of carbide. Specific examples of the steel include 4140 or 4340, and specific examples of the carbide include K313 made by Kennametal. The inserts may also be coated using any of the known coatings and coating techniques known in the art.

Different embodiments of the rail 50 are also contemplated under the invention.

The rail 50, or a design equivalent thereto such as any geometric block or extension that is not rotatable such as a square, any multiple fastener such as two pins or fasteners rather than the one fastener 54, or any other means for prohibiting rotation and shifting of the insert, is also an important feature of the invention. In conjunction with the importance of the rail design and its close tolerance to the slot 48, the seat 38 and spacer 40 design further adds to the improved finish milling ability of the invention. The spacers 40 provide rigid surface against which the inserts are supported. In addition, the seating of the rail 50 on each insert 12 or 14 in the corresponding pocket or slot 48 on a corresponding seat 38 further serves to prohibit or at least ameliorate the twisting or rotating action that is prevalent in inserts during milling. The tapered fastener 54 when tightened down in the threaded hole 44 further serves to secure the inserts against movement during milling.

Now, the defining of the trailing face 30 and rail 50 interaction in pocket 48 where the rail is on the back surface of the insert far away from the cutting edges removes the critical cutting edges (the current outermost cutting edge and the indexable innermost edge that could be used for cutting) from contact with the mill in contrast to the prior art where often one of the cutting edges or one of the side edges comparable to 62,64,82,84 are used to support and secure the insert thereby subjecting the critical cutting edges to stresses and forces that damage the cutting edge. The defining of the trailing face 30 in a radial manner to the longitudinal axis of the shank at any given cross section also serves to lessen the movement of the inserts as many of the forces on the insert during milling are perpendicular to the insert face and thus perpendicularly received by the trailing face 30. Other forces include a twisting moment on the outside edge of the insert which is controlled by the rail 50 and the fastener 54.

Overall, the rail design, fastener use, trailing face substantially radially defined and/or the use of spacers prohibit or significantly ameliorate the rotation, twisting, and overall movement of the insert within the pocket 48 thereby eliminating or reducing the pocket deformation found in the prior art from insert rocking, rotating, twisting, etc. This in effect reduces insert breakage and significantly lengthens the milling tool life as pocket deformation results in improperly positioned inserts and thus inaccurate and/or stepped milling. This prohibition or significant reduction in rotation, twisting and other movement of the insert also reduces chipping of the inserts.

The coupling of the rail design, fastener use, trailing face substantially radially defined and/or the use of spacers to more securely hold the insert in place with the new cutting insert geometry of corners of a two radiused designed separated by flat sections provides a unique milling tool that performs substantially if not all milling functions and provides a finished surface of a ground finish. Specifically, the mill 10 rotates in the angular direction as shown by v whereby it is capable of drilling in the z axis direction (such as by plunging), milling in the x or y axis directions (such as slotting), milling in the x or y direction as well as the z direction (such as ramping), milling in both the x and y axis direction simultaneously (circle interpolates), ramping and circle interpolating simultaneously, and providing both face and end mill finished surfaces which are of a finished grade. The mill is a complete three dimensional mill which also provides a finished surface without measurable stress risers (that is a surface with desirable blending resulting in a ground type finish of at least between 8 and 32 rms, if not lower) when using a steel mill body with carbide or coated carbide insert such as K313 by Kennametal.

The concepts as described above of the rail design, fastener use, trailing face radially defined, shank-insert interaction surface away from the cutting edges, use of spacers, and the unique cutting insert geometries of corners with two radii separated by flats are shown herein on a helical end mill. However, it is readily recognized by one of ordinary skill in the art that such concepts are readily applicable to all forms of milling.

The embodiment shown is a helical end mill capable of three dimensional milling including steps of drilling, ramping, circle interpolating, facing and end milling all of which result in a finished surface of a ground type finish. Numerous examples of radii and flat. dimensions of the inserts are available and contemplated by this invention as the sizes of the radii and lengths of the flats are variable depending upon the insert overall size and the insert angle.

Figure 28:
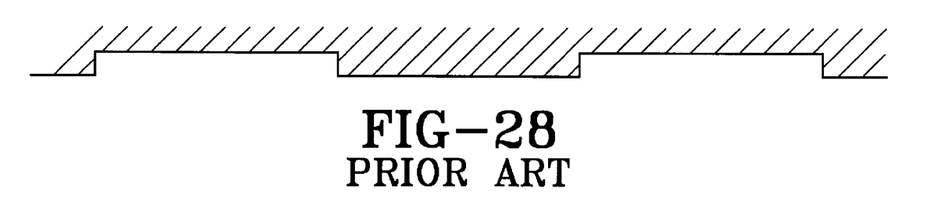
FIG. 28 is a cross section of a surface milled by a prior cut mill showing the stepping.
Figure 29:
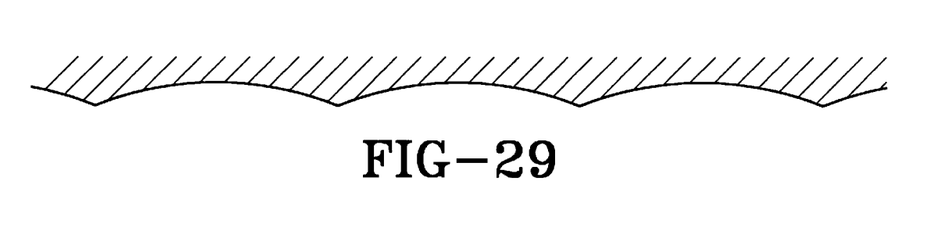
FIG. 29 is a cross section of a surface after one helical grouping of the present invention has passed.
Figure 30:
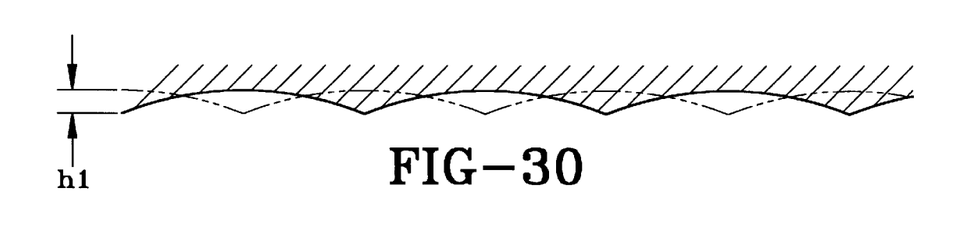
FIG. 30 is a cross section of the surface of FIG. 29 after a second staggered helical grouping has milled the surface.
Figure 31:
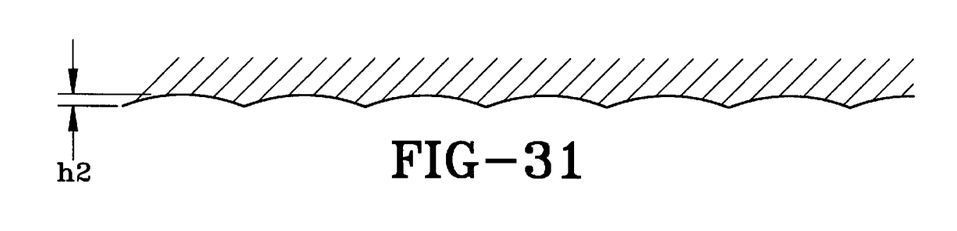
FIG. 31 shows the finished surface with the smooth blends.

The ground type finish is a result of the overlapping inserts, rail that prohibits movement, and the flat plus two radii design insert edge which provides a milled surface as shown in FIG. 31. Specifically, prior art designs caused stepping as shown in FIG. 28. This design eliminates this with a first cut as shown in FIG. 29 (one helical group has milled) followed by a second offset cut as shown in FIG. 30 (a second helical group has milled the same surface), thereby resulting in a finished surface as shown in FIG. 31. The distance between the peaks and valleys is reduced as shown by h1, h2 and h3. The distance h1 is the distance between the peaks and valleys after one helical grouping mills while the distance h2 is the reduced distance between the peaks and valleys after a second helical grouping has milled the same surface. The use of flats on the cutting edges further reduces the distance between peaks and valleys as shown by h3. The staggered or offset inserts with the two radii corner having a flat in between corners provides smoother finished surfaces and smoother extremes.

Figure 32:
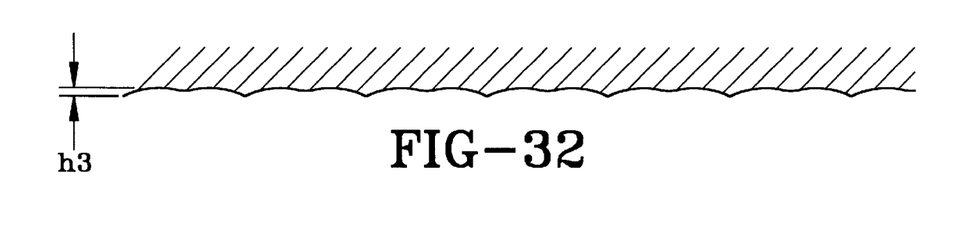
FIG. 32 shows the finished surface where the flats or crowns of the inserts have further reduced the valleys.

As a result of the two radii plus a flat edge construction, each cutting insert is fully indexable and thus has a longer life since more than one usable cutting edge is provided. Furthermore, the flat surface provides an accurate measuring and manufacturing point from which the cutting insert is manufactured since all measurements, machining, cutting, and other manufacturing steps can be more accurately made from this flat edge in comparison to the radiused edge used in prior art designs. As a result, the tolerances of the cutting insert are significantly improved. The use of the flat surface further diminishes or eliminates the valleys that often result on a milled surface from completely curved or radiused inserts by cutting less material along the middle portion of the insert during milling (as shown in FIG. 32). In addition, the overlapping or staggering of inserts over the various helical grooves 24 and 26 diminishes or eliminates the peaks that often result on a milled surface from cross sectionally aligning the inserts in adjacent grooves rather than staggering them. (The peaks formed by the rounded corners on one insert are shaved off by another offset insert). As a result of the two radii and flat insert construction and the staggered inserts in adjacent helical grooves, a surface is produced by the mill 10 that is of a ground type finish rather than the typical rough or semi-finished state provided by milling cutters. Specifically, ground type finishes varying from 8 to 32 rms have easily been achieved where rms is the distance between the peaks and valleys (this finish results using the above example or a similar mill and inserts).

Based on the foregoing, it is apparent that the milling cutter 10 of the present invention can be used to rapidly remove material from a workpiece in a single operation as the milling cutter 10 is capable of all forms of milling including drilling, plunging, ramping, circle interpolation, etc. so as to be a true three dimensional mill. The milling cutter is capable of three dimensional milling because of the rail design, the radial orientation of the trailing face, and other features which secure the inserts from rotation, twisting, and other movement thereby eliminating the problems resulting therefrom such as insert chipping, insert or mill breakage, insert slippage and thus significant stepping or peaks/valleys, etc. The mill is therefore capable of withstanding the significant axial, radial, and tangential forces on the mill and inserts during milling. In addition, the unique geometry of the inserts with the corners of a two radiused configuration and being separated by flats significantly improves the surface finish to a ground type finish thereby eliminating the need for any finish milling or grinding. This occurs because the flat portion of the insert eliminates or significantly ameliorates the valleys generally milled into the surface. The staggering or overlapping between the helical groupings also serves to more evenly mill the surface.

The present invention may, of course, be carried out in other specific ways than those set forth herein without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A milling cutter for three dimensional milling, comprising:
a plurality of cutting inserts arranged in at least two groupings longitudinally along the milling body, and where the cutting inserts in each grouping are evenly staggered in relation to one another, whereby a midpoint on any insert is aligned with a space between inserts on the adjacent grouping of inserts when viewed in cross section to the central axis, each of which includes front and back faces, at least two opposing side walls, at least two opposing end walls, radiused corners joining said side and end walls, at least one cutting edge defined at an intersection between said front face and the combination of one of said side walls and any radiused corners adjacent thereto, wherein each of the cutting edges is defined to include a flat portion between the radiused corners where each of the radiused corners is defined by at least two radii; and a milling body with a central axis therein, the milling body having a plurality of insert seats whereby at least one of the plurality of cutting inserts is securably seated in at least one of the insert seats.

2. The milling cutter of claim 1, wherein said seats include an insert receiving surface for engaging said back face of one of said inserts, said insert receiving surface being substantially radially oriented to the central axis at any cross section of said milling body.

3. The milling cutter of claim 1, wherein each radiused corner includes a larger radius section and a smaller radius section.

4. The milling cutter of claim 1 further comprising an insert movement inhibitor for preventing relative movement between said cutting inserts and said seats.

5. The milling cutter of claim 2 further comprising a radial movement inhibitor for preventing radial movement between the cutting inserts and said seats.

6. The milling cutter of claim 5 wherein the radial movement indicator includes a rail extending outward from the back face of each cutting insert and a corresponding slot in each seat for receiving said rail.

7. The milling cutter of claim 6 wherein the radial movement indicator further includes securing means for securing the insert against the seat.

8. The milling cutter of claim 3 wherein the milling body includes a plurality of helical grooves therein, the grooves including the plurality of seats, the seats each including an insert receiving surface for receiving one of the inserts, each of the surfaces includes a lug for engaging said back face of one of said inserts, said insert receiving surfaces being substantially radially oriented to the central axis at any cross section of said milling body.

9. The milling cutter of claim 8 wherein the back face of each cutting insert includes a rail, and each lug includes a corresponding slot for receiving one of the rails.

10. The milling cutter of claim 1 wherein the plurality of cutting inserts includes at least one plunging insert positioned approximate an end of the milling body and at least one milling insert adjacent thereto.

11. The milling cutter of claim 1 where each radiused corner as defined by two radii includes a large radius section and a small radius section where each large radius section is in between one of the flats and one of the small radius sections.

12. The milling cutter of claim 1 wherein the cutting inserts are grouped into helically attached groups wherein at least one of the cutting edges on each insert in each helically attached group is substantially aligned with the cutting edges of adjacent inserts in that helically attached group.

13. A milling cutter for three dimensional milling, comprising:

a plurality of cutting inserts, each of which includes front and back faces, at least two opposing side walls, at least two opposing end walls, radiused corners joining said side and end walls, at least one cutting edge defined at an intersection between said front face and the combination of one of said side walls and any radiused corners adjacent thereto, wherein each of the cutting edges is defined to include a flat portion between the radiused corners where each of the radiused corners is defined by at least two radii, wherein the cutting inserts are grouped into helically attached groups wherein at least one of the cutting edges on each insert in each helically attached group is substantially aligned with the cutting edges of adjacent inserts in that helically attached group;

a milling body with a central axis therein, the milling body having a plurality of insert seats whereby at least one of the plurality of cutting inserts is securably seated in at least one of the insert seats; and a rail extending outward from the back face of each cutting insert and a corresponding slot in each seat for receiving said rail.

14. The milling cutter of claim 13, wherein said seats include an insert receiving surface for engaging said back face of one of said inserts, said insert receiving surface being substantially radially oriented to the central axis at any cross section of said milling body.

15. The milling cutter of claim 13, wherein each radiused corner includes a larger radius section and a smaller radius section.

16. The milling cutter of claim 13 wherein the plurality of cutting inserts includes at least one plunging insert positioned approximate an end of the milling body and at least one milling insert adjacent, thereto.

17. The milling cutter of claim 13 where each radiused corner as defined by two radii includes a large radius section and a small radius section where each large radius section is in between one of the flats and one of the small radius sections.

* * * * *